UNITED STATES PATENT OFFICE.

CHARLES A. McKINNON, OF ST. LOUIS, MISSOURI, ASSIGNOR, BY DIRECT AND MESNE ASSIGNMENTS, TO McTAN CHEMICAL COMPANY, OF PHOENIX, ARIZONA TERRITORY, A CORPORATION OF ARIZONA TERRITORY.

NAP-RAISING DETERGENT AND DISINFECTANT FOR WORN WOOLENS, SERGES, AND OTHER GOODS.

991,869.

Specification of Letters Patent. Patented May 9, 1911.

No Drawing. Application filed July 16, 1910. Serial No. 572,260.

*To all whom it may concern:*

Be it known that I, CHARLES A. McKIN-NON, a citizen of the United States, residing at the city of St. Louis, State of Missouri, have invented a certain new and useful Nap-Raising Detergent and Disinfectant for Worn Woolens, Serges, and other Goods, of which the following is a specification.

My composition of matter or nap-raising detergent and disinfectant comprises carbolic acid, preferably commercial (white) about ninety-five per cent. pure, and blue-stone (crystallized), in the proportions approximately of one ounce of blue-stone to a quart of carbolic acid. The carbolic acid serves not only to disinfect the goods, but also and particularly to soften the outer fibers thereof, and the blue-stone serves, when the mixture is applied on or rubbed into the goods, to catch and pull, without breaking, the softened fibers thereof, thereby raising the new nap. As the carbolic acid is somewhat injurious to the hands of the operator and not easily handled, water, in approximately the proportion of two and one-half quarts to a quart of carbolic acid, is added, the carbolic acid being thereby diluted or weakened and the mixture rendered less injurious to the hands of the operator. As carbolic acid and water do not, however, freely mix, approximately one ounce of preferably powdered borax is further added, the carbolic acid and water then freely mixing and the mixture being thereby also saponified, so to speak, and given, to a certain extent, cleaning properties. To further increase the cleaning properties of the mixture, approximately one pint of ammonia (aqua) is further added for particularly its well-known property of removing grease and other stains and spots. The blue-stone serves also to neutralize or overcome any over-saponacity or soapiness of the mixture which might prevent or retard the employment of the mixture for ordinary uses or purposes, the resulting mixture or composition of matter being just sufficiently saponaceous to be further well adapted for use as a cleaning prepartion particularly for the kinds of goods stated. My composition, when made-up or compounded as described, may then be said to consist, to each gallon, of the said ingredients in approximately the following proportions: carbolic acid, preferably commercial (white) about ninety-five per cent. pure, one quart; ammonia (aqua), one pint; blue-stone (crystallized), one ounce; borax, preferably powdered, one ounce; and water, two and one-half quarts. To these said ingredients may further be added any suitable dark coloring matter, preferably lamp-black, approximately one hundred and fifty grains; and also, if desired, a proper amount of any suitable sweet-smelling or perfuming matter may be added to give the composition a pleasant odor. These ingredients are thoroughly intermingled, and the mass is afterward preferably strained to remove any sediment. In using my composition, the same is well rubbed in or upon the goods in any suitable manner, preferably by means of a brush; and I have found that the said ingredients so co-act together to form a composition of matter which will clean, disinfect, and raise a nap on worn woolens, serges, cheviots, broadcloth, and other similar or analogous goods. By the use of my composition, the said goods are in no way damaged or caused to fade; on the contrary, by the use of my composition, the goods are so thoroughly cleaned, brightened, the original color being preserved, and given a new nap as to present an appearance of newness. This new nap I have found to be fairly lasting; and when the goods again become worn or soiled, they may again be cleaned and given a new nap by my composition, and so on until the said goods are finally worn out from usage.

It might be added that my composition is particularly adapted for use on dark-colored goods of the kind stated, for it is well known that, while both light and dark colored goods of the kind stated become "shiny" as the nap thereon wears off, yet this "shiny" condition is not so apparent or noticeable on light-colored goods as it is on dark-colored goods of the kind stated, and my composition by giving the goods or raising thereon a new nap removes this "shiny" condition without in any way injuring the goods, the said goods afterward presenting, as stated, an appearance of newness.

So far as I am aware, I am the first to provide a composition of matter, which will not only clean, but also raise a nap on, worn goods of the kind stated.

Having thus described my invention, what I claim and desire to secure by Letters Patent is:

1. The composition of matter herein described, the same comprising carbolic acid, ammonia, blue-stone, borax, and water; substantially as described.

2. The composition of matter herein described, the same comprising carbolic acid, ammonia, blue-stone, borax, and water in approximately the following proportions: one quart carbolic acid, one ounce blue-stone, one pint ammonia, one ounce borax, and two and one-half quarts water; substantially as described.

3. The composition of matter herein described, the same comprising commercial carbolic acid one quart, ammonia one pint, crystallized blue-stone one ounce, powdered borax one ounce, and water two and one-half quarts; substantially as described.

4. The composition of matter herein described, the same comprising carbolic acid, ammonia, borax, blue-stone, water, and lamp-black; substantially as described.

5. The composition of matter herein described, the same comprising commercial carbolic acid one quart, ammonia (aqua) one pint, crystallized blue-stone one ounce, powdered borax one ounce, water two and one-half quarts, and lamp-black one hundred and fifty grains; substantially as described.

In testimony whereof, I have signed my name to this specification, in the presence of two subscribing witnesses.

CHARLES A. McKINNON.

Witnesses:
ARTHUR WEISSENBORN,
SHEPARD R. EVANS.